US006956175B1

(12) United States Patent
Daly et al.

(10) Patent No.: US 6,956,175 B1
(45) Date of Patent: Oct. 18, 2005

(54) WEIGHING APPARATUS AND METHOD

(76) Inventors: Paul C. Daly, 176 Chapel St., Abington, MA (US) 02351; Gerald J. Petrotto, 687 N. Forest Rd., Williamsville, NY (US) 14221

( * ) Notice: Subject to any disclaimer, the term of this patent is extended or adjusted under 35 U.S.C. 154(b) by 46 days.

(21) Appl. No.: 10/236,540

(22) Filed: Sep. 6, 2002

Related U.S. Application Data

(60) Provisional application No. 60/318,349, filed on Sep. 10, 2001.

(51) Int. Cl.[7] .............................................. G01G 23/01
(52) U.S. Cl. .......................... 177/1; 702/101; 177/50; 177/144; 177/185
(58) Field of Search ....................... 177/50, 144, 185, 177/1; 702/101; 73/1.13

(56) References Cited

U.S. PATENT DOCUMENTS

| | | | | |
|---|---|---|---|---|
| 2,598,532 | A | * | 5/1952 | Gibbon ........................ 600/22 |
| 4,008,776 | A | | 2/1977 | Kushmuk ................ 177/210 R |
| 4,038,973 | A | * | 8/1977 | Moore ........................... 600/22 |
| 4,347,903 | A | * | 9/1982 | Yano et al. ............... 177/25.13 |
| 4,379,495 | A | * | 4/1983 | Cocks et al. .................... 177/1 |
| 4,420,052 | A | | 12/1983 | Hale ........................... 177/132 |
| 4,553,619 | A | * | 11/1985 | Fujinaga ..................... 177/185 |
| 4,660,160 | A | * | 4/1987 | Tajima et al. ............... 702/173 |
| 4,715,457 | A | * | 12/1987 | Amacher et al. ............... 177/1 |
| 4,793,428 | A | | 12/1988 | Swersey ..................... 177/144 |
| 4,796,212 | A | * | 1/1989 | Kitagawa .................... 702/101 |
| 4,934,468 | A | * | 6/1990 | Koerber et al. ............. 177/144 |
| 5,065,830 | A | | 11/1991 | Stevenson ................... 177/263 |
| 5,376,761 | A | | 12/1994 | Koch et al. ................. 177/145 |
| 5,499,457 | A | | 3/1996 | Weiler et al. ............... 177/245 |
| 5,672,849 | A | | 9/1997 | Foster et al. ................ 177/144 |
| 6,215,078 | B1 | * | 4/2001 | Torres et al. ............. 177/25.15 |

OTHER PUBLICATIONS

Murmato, "Improved Pediatric Weighing Device for use with Portable Hanging Scales," J Trop Ped., Apr. 2000, vol. 46(2) pp. 117-118 (Abstract Only).

Hermansen, "The Influence of Equipetement Weights on Neonatal Daily Weight Measurements," Neonatal Netw., Feb. 1999, vol. 18(1) pp. 33-36 (Abstract Only).

Vessy et al., "A Comparison of Two Techniques for Weighing Young Children," Pediatr Nursing, Jul.-Aug. 1996, vol. 22(4) pp. 327-329 (Abstract Only).

Leamy et al., "Accuracy and Reliability of Weight Change Determination in a Model Infant Weighing Less Than 750 Grams," J Perinatal, Sep.-Oct. 1995, vol. 15(5) pp. 382-385 (Abstract Only).

Torrence et al., "Accuracy and Precision of Neonatal Electronic Incubator Scales," Neonatal Netw., Aug. 1995, vol. 14(5) pp. 35-39 (Abstract Only).

Engstrom et al., "41 Reliability of in-bed Weighing Procedures for Critically Ill Infants," Neonatal Netw., Aug. 1995, vol. 14(5) pp. 27-33 (Abstract Only).

(Continued)

*Primary Examiner*—Randy W. Gibson
(74) *Attorney, Agent, or Firm*—Roger M. Rathbun

(57) ABSTRACT

A scale including an event data discrimination and collection system for continuously monitoring a weight of an infant placed on the scale platen, which may be configured as a bed. Load cells are used to continuously monitor infant weight from time placed on the scale platen, so that sudden apparent weight spikes sensed by the load cells but attributable to events involved in patient care may be discarded as artifact, while gradual weight changes reflective of infant physiology are accumulated by the scale controller and used to provide a current weight for the infant.

27 Claims, 3 Drawing Sheets

OTHER PUBLICATIONS

Gatts et al., "A Modified Newborn Intensive Care Unit Enviroment may Shorten Hospital Stay," J Perinatal, Sep.-Oct. 1995, vol. 14(5) pp. 422-427 (Abstract Only).
Table-Top Infant Scale Model 20, Sales Brochure, Feb. 2001.
Cart-Mounted Infant Scale Model No. 25, Sales Brochure, Feb. 2001.
Warm Air Infant Scale Model 23, Sales Brochure, Feb. 2001.
Warm Air Infant Scale Model 28, Sales Brochure, Feb. 2001.
Radiant Warmer Scale Model 42, Sales Brochure, Feb. 2001.
Incubator Scale Model 44, Sales Brochure, Feb. 2001.
Scale-Tronics Pediatric and Infant Scale Model 4002 "Warmer and Incubator Scale", Sales Brochure, Jun. 2001.
SR Scales, SR2655 1 Gram Neonatal Scale, Sales Brochure, Apr. 2001.
Scale-Tronics Pediatric and Infant Scale Model 4802 "Pediatric/Infant Scale", Sales Brochure, Apr. 2001.

* cited by examiner

WEIGHING APPARATUS AND METHOD

CROSS-REFERENCE TO RELATED APPLICATIONS

This application claims priority from U.S. Provisional Application Ser. No. 60/318,349, filed Sep. 10, 2001, under the provisions of 35 U.S.C. § 119(e), the contents of which are hereby incorporated by reference in their entirety.

BACKGROUND OF THE INVENTION

1. Field of the Invention

This invention relates to a method and apparatus for accurately weighing a patient, such as an infant, and, in particular, to a weighing apparatus that accurately monitors an infant's weight over a period of time while the infant lies within a bed or an incubator and without disturbing the infant.

2. Description of Related Art

Premature infants are often placed within an incubator so that they may have a controlled and monitored environment to aid in their survival and growth. Premature infants are fragile and, as such, highly susceptible to stress placed upon them every time they are disturbed by physical contact such as is required for lifting, moving or performing tests. This stress can contribute to a higher incidence of complications and possibly extend the hospital stay. Studies have shown that neonates, on average, get less than 30 minutes per day of quality rest. Infants that receive more rest are shown to recover faster.

Nevertheless, it is often necessary to physically contact the infant. For example, infants, irrespective of their degree of prematurity, are often briefly placed in warmers. This is done so that while care is given, the infant is warmed by overhead heaters, and may also receive phototherapy, for example to treat jaundice. It is also often necessary to monitor the infant's weight. For example, medical therapies, such as the proper dosing of a medication, are based upon the accurate determination of the infant's weight.

Traditionally, methods of weighing infants require removal of the infant from one environment, such as an incubator, placing the infant on a scale for weighing, and returning the infant to the prior environment. The typical sequence of events when using such scales is that the scale is first activated (usually by the pressing of a key) without the infant being placed on the scale. The scale is then calibrated to zero, and the infant is placed on the scale to be weighed. It can be appreciated that this sequence of events requires removing the infant from the incubator, for example, and thus significantly disturbs the infant. The present inventors recognized that it would be desirable to have a technique for accurately weighing the infant, in both the shorter and longer term environments in which they may be placed, to assess growth and health status and without disturbing and, thus, placing unneeded stress upon the infant.

U.S. Pat. No. 5,376,761 (hereinafter "the '761 Patent"), issued to Koch on Dec. 27, 1994 discloses a removable in-bed scale that slides underneath a platform on which the infant is lying. As disclosed by the '761 patent, the infant is weighed by sliding the weighing apparatus underneath the infant platform and raising that platform from its normal resting base, so that it becomes supported by the weighing apparatus. The weight of the platform with infant, bedding, and the weight of any connecting tubing or else resting upon the platform is measured. The '761 patent notes that "if the weight of the platform is known from previous readings, the weight of the infant may be determined directly. Otherwise, the infant may be momentarily raised by the attending personnel off of the platform and a reading taken of the weight of the platform and all items resting thereof. Then the infant is then replaced, its weight is readily taken." As the '761 patent acknowledges that it is important not to disturb the infant, the requirement of momentarily raising the infant off the platform to provide an accurate weight of the infant demonstrates the shortcomings of the disclosed device.

Existing products, such as the Scaletronix Model 4002 described in the Scaletronix literature, are designed to fit all popular incubators and radiant warmers to satisfy the need for an in-bed scale. The Model 4002 is an in-bed scale that is described as taking the weight of the infant at a particular point in time, e.g., whenever the caregiver decides to do so, and cycling automatically through the weighing process. It also is disclosed as providing the infant's current weight, previous weight, and the time lapse since the last weighing. The ability to reweigh the infant without disturbing him or her is also disclosed. The Model 4002 provides an open weighing frame that allows x-rays to be taken without moving the scale or patient, as well as a shock-absorbing capability. Accuracy is disclosed to be programmable to 1 gm, 5 gm, 10 gm, or 1/10 oz.

Despite the presence of features that help automate the periodic weighing process, with the Model 4002 the caregiver must, to obtain an accurate weight for the infant, also assure that all extraneous items (i.e. pacifiers, beanie infants, pillow, blankets, etc.) are removed from the bed. Further, the caregiver must try to manually negate the effect of any intravenous lines and tubing that are attached to the infant in order to attempt to get an accurate weight. For example, the caregiver must move the tubing while trying not to lift an extremity that the tubing is attached to and, thus, avoid inadvertently taking some of the infant's weight off the scale.

However, it often happens that the infant's limbs are accidentally partially lifted off the scale during this process. The weight that is then taken is not accurate and, even though the infant may not be physically moved from the location of its bed, due to the requirement of removing the extraneous items from the bed as well as physical contact with the infant to suspend the weight of any lines and tubing, the entire process can still be highly traumatic to the infant. Moreover, two or three sets of weights are often taken during a weighing session for each infant to check for repeatability of the measurement technique. As a result, the potential for trauma and disturbance of the infant is enhanced. The weighing process using the Model 4002 scale may also involve two nurses, depending on the patient and the degree of attached medical paraphernalia.

As a further disadvantage of conventional scales, most caregivers do not trust the weights taken using in-bed scales, or do not believe the scales are accurate due to the deficiencies attendant to the weighing process as described above. Because it is common for the process of weight data collection for hospitalized infants to be performed at least once a day, there is clearly a need for an accurate, non-traumatizing weighing technique. It has been demonstrated that existing products do not interface well with the needs of the nurse and the infant and, significantly, still require that the infant or paraphernalia attached to the infant be lifted from the weighing surface to get an accurate weight. As such, there is a clear need for an in-bed scale that is capable of continuously and accurately providing an infant's weight without disturbing the infant.

SUMMARY OF THE INVENTION

Accordingly, it is an object of the present invention to provide an in-bed scale that overcomes the shortcomings of conventional infant weighing techniques. This object is achieved according to one embodiment of the present invention by providing an infant weighing system that includes a scale platen and at least one sensor for providing output data indicative of changes in weight supported by the scale platen. A microprocessor coupled to the sensor is programmed to: (1) store an initial output data segment as an initial data record indicative of an initial weight supported by the scale platen in memory, (2) receive subsequent output data segments indicative of each subsequent weight change over a period of time, (3) sort the subsequent output data segments into one of at least two categories responsive to at least one of (a) a duration of time during which each subsequent output data segment is generated, or (b) a magnitude of each subsequent output data segment, (4) discard output data segments sorted into at least one category, and (5) apply output data segments in the at least another category to a previously determined and stored cumulative output data record to update the data record. It can be appreciated that the infant weighing system of the present invention eliminates any need to disturb an infant during the weighing process, and, thus, eliminates the problems associated with such disturbance, while also alleviating problems associated with conventional approaches to infant weighing.

It is a further object of the present invention to provide a method of monitoring the weight of a patient that also overcomes the shortcomings of conventional weighing methods. The object is achieved by providing a method of monitoring the weight of a patient that includes the steps of (1) acquiring data indicative of an initial weight of the patient and storing the data in memory, (2) measuring a plurality of subsequent apparent weight changes, (3) sorting each subsequent apparent weight change into one of at least two categories responsive to at least one of (a) a duration of time over which each subsequent apparent weight change occurs or (b) magnitude of each subsequent apparent weight change, (4) discarding subsequent apparent weight changes sorted into at least one category, and (5) applying subsequent apparent weight changes in at least another category to a previously determined and stored weight to generate an updated weight of such a patient. As with the above-described apparatus, it can be appreciated that the weighing method of the present invention eliminates any need to disturb an infant during the weighing process, and, thus, eliminates the problems associated with such disturbance, while also alleviating problems associated with conventional approaches to infant weighing.

These and other objects, features and characteristics of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention.

DETAILED DESCRIPTION OF THE PRESENTLY PREFERRED EMBODIMENTS OF THE INVENTION

Figure 1:
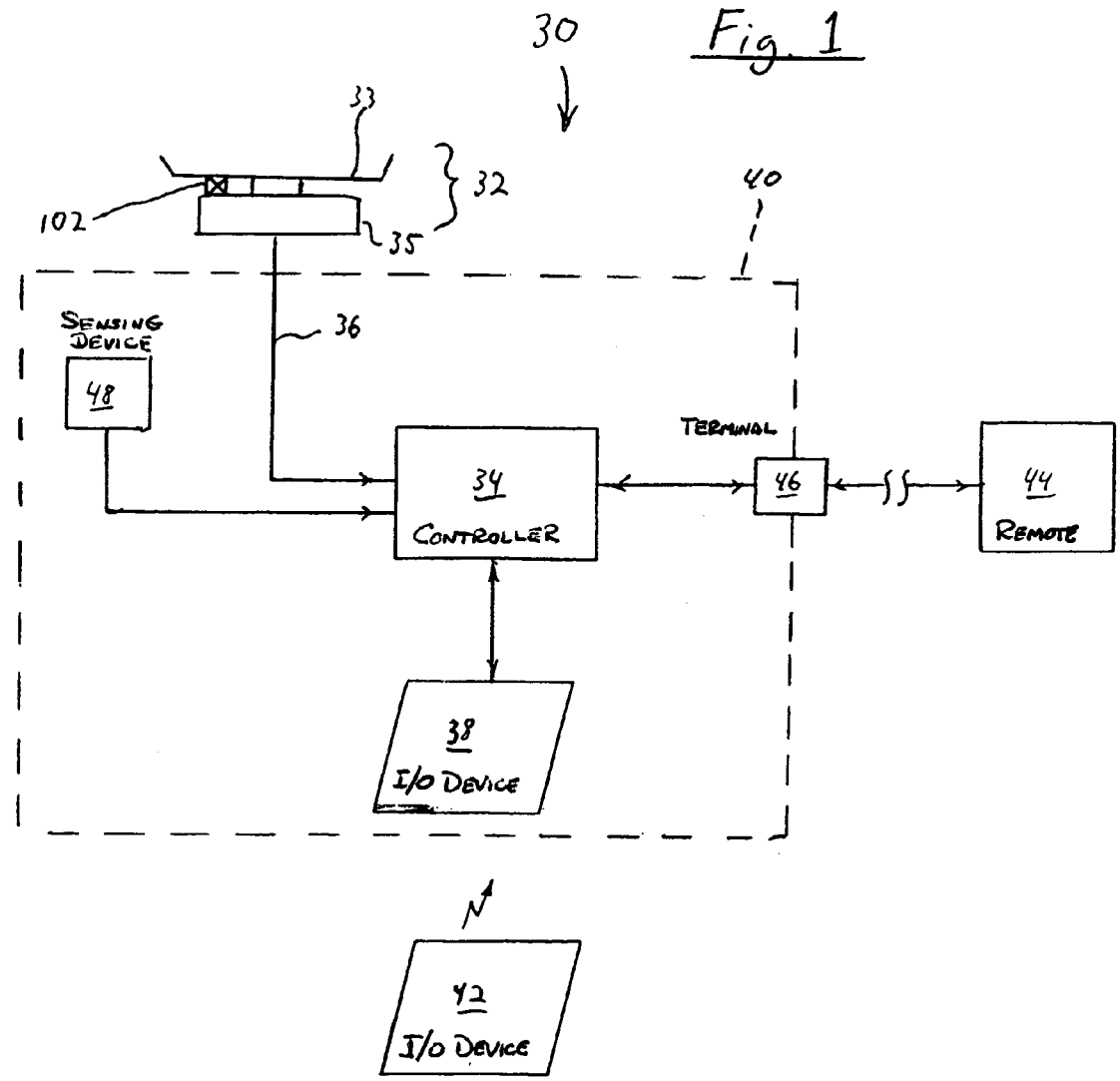
FIG. 1 is a schematic diagram of a weighing system according to the principles of the present invention.

A weighing system 30 according to the principles of the present invention is schematically shown in FIG. 1, which illustrates the basic hardware components of the weighing system, as well as optional components that can be used in conjunction with the basic components to provided additional functionality. Weighing system 30 includes a scale 32 and controller 34, which is preferably a microprocessor capable of running a processing routine. Scale 32 is any conventional weighing device that is capable of outputting a signal 36 indicative of the weight of the objects placed thereon. Preferably, scale 32 is an in-bed scale having a scale platen 33 that is sized and configured to fit inside an incubator or radiant warmer, either as a component of an originally manufactured equipment, as a retrofit item to existing infant beds, or as a stand-alone unit. A sensor 35 associated with the scale platen outputs signal 36 indicative of the weight supported by the platen.

In an exemplary preferred embodiment of the present invention, sensor 35 in scale 32 is configured as a single or as a multiple (e.g., four) point load cell design that is accurate to within 0.01% of the load being weighed. The present invention further contemplates that the scale includes a mattress tray that is able to be tilted in either direction for Trendelenberg applications. The tray is formed from radio translucent composites and may include a compartment directly below the patient-carrying surface thereof and configured to hold an x-ray tray for in-place patient imaging.

Weighing system 30 also includes an input/output device 38 that communicates with controller 34 for displaying output data from the controller and for providing information to the controller as discussed in greater detail below. In the illustrated embodiment, input/output device 38 is co-located with controller 34. That is, the controller and the input/output device are both contained or provided in a common housing, as indicated by dashed line 40 in FIG. 1. Of course, the input/output device or an additional input/output device can be remotely located from controller 34 and communicate therewith using any conventional technique, either hardwired or wireless, so that the patient environment is not compromised. For example, FIG. 1 illustrates an input/output device 42, such as a conventional PDA, that wirelessly communicates with controller 34 either in place of or in addition to input/output device 38. It can be further appreciated that scale 32 can also be contained within the same general housing or provided at location remote from the controller and input/output device.

The present invention also contemplates that the data output by scale 32, the results generated by controller 34, or both can be provided to a remote location 44, such as monitor at a nurse's station in a hospital or any other remote location. The data provided to remote location 44 can be displayed in real time, stored in a database, processed further, or any combination thereof. In this manner, a database of the weights collected for each patient can be monitored and analyzed, e.g., a trend analysis can be performed. A communication terminal 46 provides the appropriate communication link, which is either wireless or hardwired, with remote location 44. For example, communication terminal 46 can be a conventional RS-232 port, modem, infrared transceiver, or any other conventional communication device.

The present invention contemplates that weighing system 32 can include one or more additional sensing devices 48 that may be used to arrive at a more accurate weight determination. For example, a temperature sensor, a humidity sensor, a pressure sensor, or any combination thereof may be provided as additional sensing device 48. The output of such sensors are provided to controller 34 and used to adjust the output data 36 from scale 32 to compensate for environmental conditions, such as temperature, humidity and barometric pressure using conventional compensation techniques.

Figure 2:
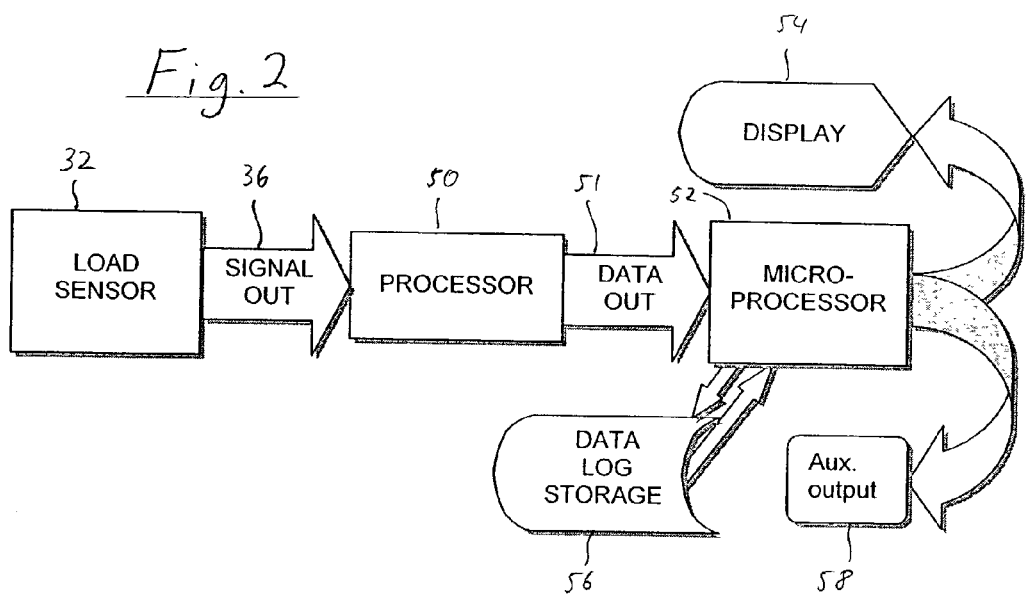
FIG. 2 is a schematic diagram illustrating an exemplary association of components of a scale and controller used in the weighing system of FIG. 1.

FIG. 2 is a hardware schematic illustrating an exemplary association of the components of weighing system 30 incorporating teachings of the present invention. Scale 32, which is identified in FIG. 2 as a "load sensor", communicates a weight measurement signal 36 to a processor 50 in controller 34. Weight measurement signals 36 are processed by processor 50 of controller 34, under instructions from software thereof, and converted to weight measurement data 51. In the embodiment shown in FIG. 2, weight measurement data 51 is communicated by processor 50 of controller 34 to a microprocessor 52 of a computer associated with controller 34. The present invention contemplates that microprocessor 52, which may be incorporated into controller 34 are provided as a separate processing system, may communicate the weight measurement data to a display device 54 (e.g., a monitor), a storage device 56 (e.g., a hard drive, a floppy disk, a CD-ROM, DVD, etc.), and/or an auxiliary device 58, such as a computer network where other information about the infant patient is stored, monitored, and/or processed. It can be appreciated that FIG. 2 illustrates that stored data may be retrieved by a processor from a memory device 56 for further processing, evaluation, or output.

Figure 3:
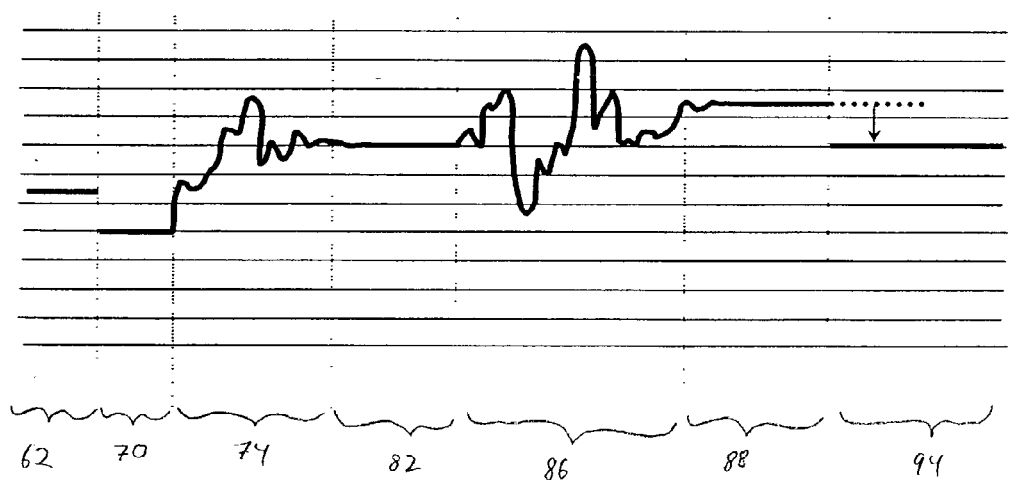
FIG. 3 is a graph that depicts an example of variations in the weight of a patient over time.
Figure 4A:
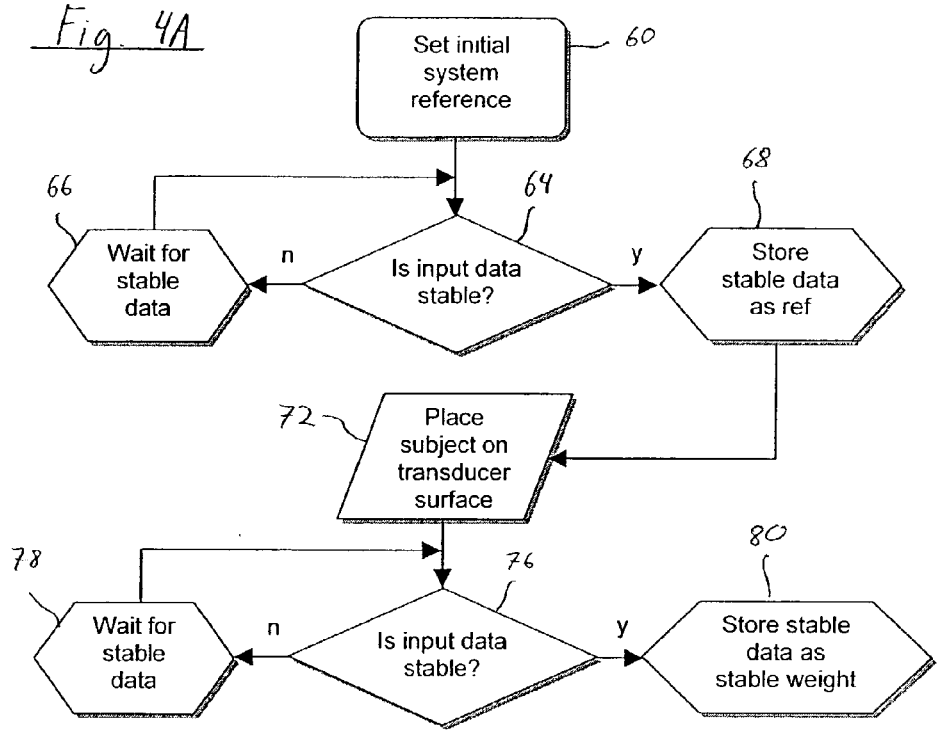
FIGS. 4A and 4B are flow charts that depict an exemplary embodiment of process flow according to the present invention.
Figure 4B:
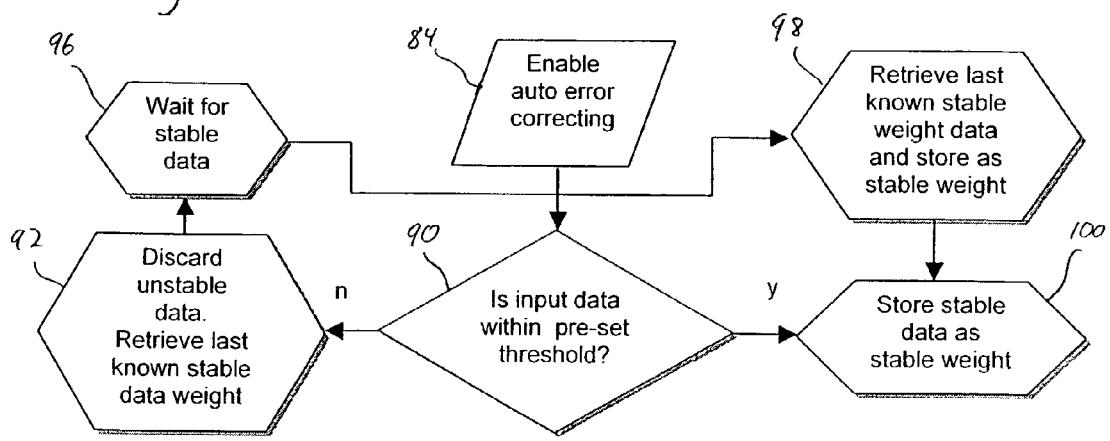

The operation of weighing system 30 according to the principles of the present invention is discussed below with reference to FIGS. 3, 4A and 4B, and with continuing reference to FIGS. 1 and 2. Beginning in step 60, the weighing system is activated and initial weight signals are provided from the sensor as shown by area 62 in FIG. 3. In step 64, controller 34 monitors the signal from the sensor to determine if the data from the sensor is "stable".

A segment of weight data is considered stable if it is substantially constant for a predetermined period of time. Thus, if a segment of constant data is received, but the duration of this segment is less than the predetermined period of time, the data is considered unstable. Similarly, if the data segment is not constant, for example, the magnitude of the data is fluctuating by a predetermined amount, it is considered unstable.

If the data from the sensor is not stable, the processing routine moves to step 66 and waits for stable data. Once stable data is detected in step 64, it is stored as reference data in step 68. These steps shown in FIG. 4A correspond to "zeroing" of the scale, as illustrated by area 70 in FIG. 3. Once the zero point of the scale has been set, the infant is placed in a crib or incubator and on the scale therein as indicated by step 72. This is shown by area 74 in FIG. 3, which includes several spikes followed by a weight increase. In step 76, the controller again monitors the input data and determines whether it is stable. If not, the system weights a brief period of time for stable data, as indicated by step 78 and returns to step 76 to look for stable data. If the data is stable, the system stores the data as stable weight data in step 80. Stable data is shown by area 82 in FIG. 3. Scale 32 collects weight data on a substantially continuous basis while the infant is on or over the bed surface and provides this data as signal 36 to controller 34. Software in controller 34, i.e., steps 76, 78 and 80, monitors the weigh data and disregards sudden detected weight changes of the infant as artifact and discards them. As a result, only gradual weight gains or losses associated with physiological events of the infant are recognized as true indicators of weight changes. Such true indicators of weight change are used to alter previously collected weight data to update and maintain an accurate current weight for the infant. All previously collected data is stored in memory and may be accessed for later review, for example, in weight trend analyses.

An additional functionality of the weighing system of the present invention is its ability to account for abrupt weight altering events, such as the addition or removal of a stuffed animal or blanket to the crib, changing of a diaper, addition or removal of peripheral attachments, etc. This ability is shown in FIG. 4B. In step 84, the controller enters the abrupt weigh change process, also referred to as the auto error correcting feature of the present invention. An abrupt weight altering event is shown by area 86 in FIG. 3, this area again includes weight spikes, and corresponds to relatively short period of time during which the cause of the abrupt weight change is occurring, for example, various apparatus are being attached, adjusted, or removed from the infant, or during which a diaper change is being made.

Once the weight measurement again becomes stable, as shown in area 88 section of the graph, the software of the scale controller evaluates in step 90 the period of time over which such spiking occurred. If the spiking occurred during a relatively short period of time and/or had a magnitude outside acceptable levels, the controller attributes any increase or decrease in the measured weight of the infant to an unnatural cause. This is shown in step 92 and illustrated as area 94 in FIG. 3, where the weight data is discarded an the last known stable weight is retrieved. Thereafter, the software waits for stable data in step 96 and returns to step 90 to continue to monitor for abrupt weight changes. In addition, the software of the controller in step 98 reverts back to the last-measured stable weight of the infant, disregarding any increase or decrease in the measured weight that occurred over a short period in time. In step 100, this "previous stable data" from step 98 is stored as the stable weight. Of course, if the spiking did not occur during a relatively short period or has a magnitude within acceptable levels as monitored in step 90, the system would go to step 100 and accept the stable data and the stable weight.

An underlying concept for the present invention is that a naked, for example, premature infant may be placed on the surface of the bed of the present invention initially in the first minutes of his or her life. Depending on the infant's initial condition, various items may be interfaced to the infant or placed in the infant's immediate environment over the bed such as intravenous lines, diapers, endotracheal tubes, developmental supports, stuffed animals, etc. These items or interventions add or subtract some type of perceived or detected weight in a very short period of time, such as seconds or minutes. The scale of the present invention measures each change to the initial weight taken, including changes that result from procedures that may add pressure or load the scale surface, or subtract therefrom. Short term changes each appear as a weight "spike" to the software of the scale controller and are sorted into a first category responsive to at least one of the short duration thereof and the magnitude thereof.

Physiologically, infants either gain or lose body weight at a gradual rate, such gains or losses being sorted by the software of the scale controller into a second category. Any spike (weight gain or loss within a short period of time or substantial weight gain or loss outside the realm of physiological possibility) seen by the scale and sorted into the first category is negated by the software because the weight change occurred in a short time span or is far too great to be physiologically possible, while gradual, relatively small weight changes sorted into the second category are used to augment (by addition or subtraction) the prior weight history of the infant as maintained by the scale.

The ability of the software to discern the nature of various weight changes, for example by recognizing spikes and negating them as erroneous data, allows the weight measured and displayed to more accurately reflect the actual body weight of the infant which is altered gradually in terms of weight gain or loss detected over an extended period of time, such as hours. Standard operation includes displaying the actual current weight which is updated every few seconds. The discarded "spike" data may be kept in memory for later review similar to the manner in which an event recorder operates. If the caregiver wishes to access data, such as data that corresponds to time periods when items were added or subtracted from the patient's environment, such data may be retrieved for advanced operation use by known processes, such as by use of a pull down menu system generated by the software of the scale controller, as well as appropriate output (e.g., a monitor) and input (e.g., a mouse, keyboard, touch-sensitive screen, etc.) devices.

In effect, the weighing system of the present invention may be characterized as an event data discrimination and collection system configured for weighing, tracking weight changes, sorting them by category and discarding or using each change according to its category to build an ongoing weight history for the infant.

The software of the controller may also be manipulated manually by the user. Thus, a caregiver can manually annotate weight spikes using the input/output devices discussed above for record keeping so that all additions and subtractions to the infant's environment are logged.

The present invention also contemplates providing the ability to lock the scale so that the system does not record any weight changes. For example, it may be desirable to physically lock the scale platen in place to prevent unwanted force from being applied on the load sensing cell or cells. A physical locking mechanism 102 that prevents movement of the scale is shown schematically in FIG. 1. This feature may be used, for example, during shipping of the scale, set up, or during procedures with the incubator or crib that are likely to produce relatively large weight fluctuations, such as changing of the sheets.

The above-described locking function can also be achieved by preventing data output from the scale sensor from being considered by the controller, with our without physically locking the scale platen in place. For example, when the user can actuate a "lock" button on the input/output device. This locking signal is provided to controller 34, so that any output data segments received by the controller 34 during a period of time in which the locking signal is also received by the controller are not used to determine the data record. They are simply discarded. Again, this feature would make it easier for the user to ensure that the proper weight data is provided to the controller and that improper data, such as weight measurements taking while the sheets are being changed, are not considered in determining the true weight of the infant.

In addition, the scale is also configured as a device to measure void weights. As the infant voids into a diaper or other collection device, the infant's measured weight does not change only a gradual increase or decrease. When the void collection device is removed and a new one put in its place, the caregiver may push a button or otherwise signify that the detected event was a diaper change and the sharp weight reduction is displayed as the weight of the void. This patient information is a critical part of patient care and the void weight data may be stored by the scale controller or otherwise (e.g., manually) in the patient record. The scale then continues to collect weight data from the new, lighter weight of the infant as the actual infant weight. Because the scale is substantially continuously collecting weight data, it has the ability to store weight trends, which can be very important data for the caregiver. The scale is configured to collect and store this data for several days, after which the data can be downloaded in several formats, displayed locally or remotely, printed out, downloaded to a central station for record charting, etc.

In addition to enabling void weight measurement and tracking, and diaper change tracking as noted above, the scale of the present invention is also configured to enable medication schedule tracking, turning schedule tracking and feeding event tracking through appropriate caregiver inputs, if chosen from an optional advanced operations mode menu of the software of the scale controller.

Unnecessary infant handling is drastically reduced with the present invention, resulting in less waking of the infant and thus more uninterrupted sleep. Consequently, the infant makes a quicker recovery, which results in less time in an extremely expensive intensive care unit.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims.

What is claimed is:

1. An apparatus for monitoring weight of a patient, comprising:
   a scale platen;
   at least one sensor for providing output data indicative of changes in weight supported by the scale platen;
   a microprocessor programmed to:
   (1) store an initial output data segment as an initial data record indicative of an initial weight supported by the scale platen in memory,
   (2) receive subsequent output data segments indicative of each subsequent weight change over a period of time,
   (3) sort the subsequent output data segments into one of at least two categories responsive to both: (a) a duration of time during which each subsequent output data segment is generated and (b) a magnitude of each subsequent output data segment, (4) discard output data segments sorted into at least one category, and (5) apply output data segments in the at least another category to a previously determined and stored cumulative output data record to update the data record.

2. The apparatus of claim 1, wherein the microprocessor is programmed to convert at least one of the output data record and output data segments to a weight.

3. The apparatus of claim 2, further comprising a display device adapted to display at least one of the converted output data record and the output data segments as a weight.

4. The apparatus of claim 1, further comprising a communications link adapted to transmit at least one of the output data record and output data segments to a remote site.

5. The apparatus of claim 1, further including a manual input element for enabling manual logging of a patient care event.

6. The apparatus of claim 5, wherein the patient care event is at least one of diaper changing, changing clothing, feeding, and turning.

7. The apparatus of claim 1, further including a manual input element for enabling determination of a void weight by the microprocessor responsive to generation of a data output segment prior to removal of a void collection device from a patient supported on the platen and generation of a subsequent data output segment subsequent to the removal of the void collection device.

8. The apparatus of claim 7, wherein the microprocessor is programmed to store a plurality of void weights in memory and to compile a cumulative void weight from the plurality of void weights.

9. The apparatus of claim 1, further including a communications link for downloading at least one of the output data record and output segments to an external memory.

10. The apparatus of claim 1, wherein the microprocessor is configured to store a plurality of output data segments in at least another category in memory and to calculate at least one weight trend over a selected period of time from the plurality of stored output data segments.

11. The apparatus of claim 1, further comprising a locking mechanism operatively coupled to the scale platen of the at least one sensor to prevent actuation of the sensor responsive to the locking mechanism being actuated.

12. The apparatus of claim 1, further comprising a manual input element adapted to provide a locking signal to the microprocessor, wherein any output data segments received by the microprocessor during a period of time in which the locking signal is also received by the microprocessor are not used to determine the data record.

13. The apparatus of claim 1, further comprising at least one of a temperature sensor, a humidity sensor, and a barometric pressure sensor, and wherein the microprocessor adjusts the output data segments in at least another category or the data record based on an output of at least one of the temperature sensor, the humidity sensor, and the barometric pressure sensor.

14. A method for monitoring weight of a patient, comprising:

acquiring data indicative of an initial weight of the patient and storing the data in memory, measuring a plurality of subsequent apparent weight changes;

sorting each subsequent apparent weight change into one of at least two categories responsive to both (a) a duration of time over which each subsequent apparent weight change occurs and (b) magnitude of each subsequent apparent weight change;

discarding subsequent apparent weight changes sorted into at least one category; and applying subsequent apparent weight changes in at least another category to a previously determined and stored weight to generate an updated weight of such a patient.

15. The method of claim 14, further including displaying at least one of a weight and a subsequent apparent weight change sorted into the at least another category.

16. The method of claim 14, further including transmitting at least one of a weight and a subsequent apparent weight change sorted into the at least another category to a remote site.

17. The method of claim 14, further comprising manually logging a patient care event for storage in memory.

18. The method of claim 17, further comprising selecting the patient care event as at least one of diaper changing, feeding, the addition or removal of an article to the infant or infant surroundings, a surgical procedure and turning.

19. The method of claim 14, further manually enabling determination of a void weight responsive to generation of an updated weight prior to removal of a void collection device from the patient and generation of a subsequent updated weight subsequent to the removal of the void collection device.

20. The method of claim 19, further comprising storing a plurality of void weights in memory and compiling a cumulative void weight from the plurality.

21. The method of claim 14, further including downloading at least one of a weight and a subsequent apparent weight change sorted into the at least another category to an external memory.

22. The method of claim 14, further including storing a plurality of subsequent apparent weight changes in the at least another category in memory and calculating at least one weight trend over a selected period of time from the plurality of stored subsequent apparent weight changes.

23. The method of claim 14, further comprising locking the scale platen or the at least one sensor to prevent actuation of the sensor.

24. The method of claim 14, further comprising manually inputting a locking signal that prevents apparent weight changes occurring during a period of time in which the locking signal provided from not used to determine the updated weight.

25. The method of claim 14, further comprising adjusting the subsequent apparent weight changes in the at least another category based on an output of at least one of a temperature sensor, a humidity sensor, and a barometric pressure sensor.

26. The method of claim 14 further including the step of marking weight changes of at least one of the at least two categories.

27. The apparatus of claim 1 further comprising a means to mark weight changes of at least one of the two categories.

* * * * *